United States Patent
Uesaka et al.

(10) Patent No.: US 7,381,363 B2
(45) Date of Patent: Jun. 3, 2008

(54) PLASMA PROCESSING APPARATUS FOR POWDER AND PLASMA PROCESSING METHOD FOR POWDER

(75) Inventors: Shujiroh Uesaka, Yasugi (JP); Gang Han, Yonago (JP); Eiji Hirakawa, Higashiizumo (JP)

(73) Assignee: Hitachi Metals, Ltd., Tokyo (JP)

( * ) Notice: Subject to any disclaimer, the term of this patent is extended or adjusted under 35 U.S.C. 154(b) by 603 days.

(21) Appl. No.: 10/998,133

(22) Filed: Nov. 29, 2004

(65) Prior Publication Data

US 2005/0183542 A1 Aug. 25, 2005

(30) Foreign Application Priority Data

Feb. 5, 2004 (JP) .............................. 2004-029747

(51) Int. Cl.
*B22F 9/14* (2006.01)
(52) U.S. Cl. .................... 266/103; 266/202; 219/121.5
(58) Field of Classification Search ............ 219/121.5, 219/122; 266/103, 202
See application file for complete search history.

(56) References Cited

U.S. PATENT DOCUMENTS 3,594,609 A * 7/1971 Vas ........................ 315/111.41
3,676,638 A    7/1972 Stand
5,073,193 A * 12/1991 Chaklader et al. ............. 75/346
2002/0168466 A1* 11/2002 Tapphorn et al. ........... 427/180

FOREIGN PATENT DOCUMENTS

JP   2001-020065   1/2001
JP   2002-180112   6/2002

OTHER PUBLICATIONS

E. Boyer, et al; "Parametric study of suspension plasma sprayed hydroxyapatite", Thermal Spray Practical Solutions for Engineering Problems, C.C.. Berndt (ed.) published by ASM Internatinal, Materials Park, Ohio-USA, 1996 P683-690.

* cited by examiner

Primary Examiner—George Wyszomierski
(74) Attorney, Agent, or Firm—Sughrue Mion, PLLC

(57) ABSTRACT

A plasma processing apparatus for powder, and a plasma processing method of powder, in which a powder supply nozzle is provided to supply a powder material into plasma flame generated inside a high-frequency coil, the powder supply nozzle arranged substantially radially centrally of the high-frequency coil comprises a revolving flow forming device, for example, a spiral-shaped plate, to cause a carrier gas and the powder material to form therein a revolving flow with an axis thereof directed axially of the high-frequency coil, and the revolving flow is discharged from an outlet at an end of the nozzle. More preferably, a transition space is provided between the outlet at the end of the nozzle and the revolving flow forming device, and the outlet at the end of the nozzle is made small in diameter.

9 Claims, 6 Drawing Sheets

30 μm

50 μm

PLASMA PROCESSING APPARATUS FOR POWDER AND PLASMA PROCESSING METHOD FOR POWDER

TECHNICAL FIELD

The present invention relates to a plasma apparatus for powder to highly efficiently spheroidize powder at a high rate of spheroidization, and a plasma processing method for powder.

BACKGROUND OF THE INVENTION

Conventionally, there have been used in the field of powder metallurgy compression molding, in which powder is packed in a mold and compressed in order to mold a product with powder as a raw material, a method of placing a compressed green compact in a high-temperature furnace to sinter the same, and the like. In recent years, a demand for high purity and high density of products has become great, and so there has been used a hot isostatic pressing method of vacuum-sealing powder in a can made of thin steel sheet or glass, placing the can in a furnace, which is filled with gases such as Ar, $N_2$, or the like, and applying high temperature and high pressure thereto to achieve compression sintering.

In case of molding a product by the hot isostatic pressing method, however, there is a danger of deformation of the product or bursting of a can due to an increase in contraction ratio at the time of molding in the event that powder being a raw material is low in packing density.

Therefore, a high packing density is demanded of a powder material used in the hot isostatic pressing method.

Spheroidization of a powder material is known as measures of enhancing such packing density.

A spheroidized powder is enhanced in flowability to afford uniform packing. In particular, even powder of high cohesiveness is effective because of a rapid increase in packing density when it is prepared to make a spheroidized powder of a predetermined particle size.

Also, since an expensive powder material gives rise to a great demand for a near net shape, a spheroidized powder affording a high packing density is effective.

Also, a spheroidized powder material is needed in the field of plasma spraying with a view to an increased flowability in powder supply. Further, a spheroidized powder or a near spheroidized powder is demanded in use for catalyst and chemical industries.

As a method of preparing such spheroidized powder, for example, JP-A-2002-180112 presented by the applicant of the present application discloses a method of using plasma.

In a technique disclosed in JP-A-2002-180112, a mixed gas of Ar and $H_2$ is used to generate high frequency induction thermal plasma, powder is passed through plasma having temperature of 3000 to 10000° C. to melt and spheroidized by surface tension, a reducing gas is used to remove oxygen or impurity substances of low melting point contained in the powder, the molten powder falls in a chamber while being cooled, and coagulates as it is to provide a spheroidized powder of high purity.

The method of spheroidizing a powder material with the use of plasma is advantageous and effective in terms of removal of impurities as described above.

However, thermal plasma generated in electromagnetic induction of high frequency electric power principally involves the skin effect, so that temperature distribution in plasma flame is not even. Actually, a high-temperature region is formed in an outer peripheral portion of plasma flame and a low-temperature region is formed in a central portion of plasma flame. The technique described in JP-A-2002-180112 is advantageous in that a central low-temperature region is made the most of to permit a powder supply nozzle to be inserted centrally of plasma flame to enable passing every supplied powder through the flame for processing. On the other hand, as a result of examination conducted by the inventors of the present application, however, the inventors were confronted with a problem that as powder supplied into plasma is increased in amount, spheroidization does not advance adequately.

This is because, while damage against the powder supply nozzle is less when a powder material is supplied from that neighborhood radially centrally of a high frequency coil, which is included in the low-temperature region, a powder material gushing out linearly from the powder supply nozzle falls without passage through the high-temperature region of plasma, thus plasma energy can not be used effectively for the powder treatment.

As an approach to this problem, a technique is proposed, in which a powder material is acted upon at an outlet of a nozzle by external gases in a manner like gas atomization and is diffused in a high-temperature region of plasma formed in a doughnut-shaped manner (Thermal Spray. Practical Solutions for Engineering Problems, C. C. Berndt (Ed.), Published by ASM International, Materials Park, Ohio-USA, 1996 P683-690).

Because of the ability to make effective use of thermal energy, the technique of supplying a powder material to a high-temperature region of plasma achieves an increase in efficiency of spheroidizing processing and so is effective in industrial production. However, the technique proposed in the above document by C. C. Berndt involves a problem of increased control factors because of the use of a third gas as a drive force for diffusion of powder, and a problem of the necessity of maintaining a mechanism, which serves to supply the third gas and is exposed to high temperature, in a controllable state, and the inventors of the present application have not been able to apply the technique to industrial production.

Also, the inventors of the present application have examined a method of supplying a powder material not to a center of a high frequency coil, that is, a low-temperature region of plasma but directly to a high-temperature region of plasma. However, powder particles connect together due to an increased supply of the powder material and melt as they are, to show a tendency that powder containing coarse particles results, thus making application to industrial production difficult.

SUMMARY OF THE INVENTION

It is an object of the invention to provide a plasma processing apparatus for powder and a plasma processing method for powder, which can make effective use of plasma energy in order to increase processing efficiency, and for industrial production.

The inventors of the present application have achieved the invention finding that a powder material can be diffused to a high-temperature region of plasma from a low-temperature region of plasma and made remarkably high in processing efficiency by a constitution, in which a powder supply nozzle is arranged substantially radially centrally of a high frequency coil and a carrier gas and a powder material are supplied while forming a revolving flow within the powder supply nozzle.

That is, the invention provides a plasma processing apparatus for powder, comprising a powder supply nozzle to supply a powder material into plasma flame generated inside a high-frequency coil, and wherein the powder supply nozzle is arranged substantially radially centrally of the high-frequency coil and comprises a revolving flow forming device to cause a carrier gas and the powder material to form therein a revolving flow with an axis thereof directed axially of the high-frequency coil, and the revolving flow is discharged from an outlet at an end of the nozzle.

According to the invention, the revolving flow forming device preferably comprises a spiral-shaped flow passage arranged in the cylindrical-shaped powder supply nozzle.

Preferably, the outlet at the end of the powder supply nozzle has an inside diameter smaller than that of a portion, in which the revolving flow forming device is arranged, or a transition space is formed between the revolving flow forming device and the outlet at the end of the powder supply nozzle.

A more concrete embodiment provides a plasma processing apparatus for powder, comprising a high-frequency coil provided outside a plasma generating space partitioned by a cooling wall, a gas providing unit to supply a plasma gas from one axial end of the high-frequency coil, a powder supply nozzle to supply a powder material and a carrier gas into plasma flame generated inside the high-frequency coil, a chamber provided downstream of the plasma flame, and an exhaust unit for exhaustion from the chamber, and wherein the powder supply nozzle is arranged substantially radially centrally of the high-frequency coil and comprises a revolving flow forming device to cause a carrier gas and the powder material to form therein a revolving flow with an axis thereof directed axially of the high-frequency coil, and the revolving flow forming device comprises a spiral-shaped plate formed by twisting a flat plate and arranged in a position, in which an axis of the spiral-shaped plate corresponds to a longitudinal direction of a flow passage.

Also, the invention provides a plasma processing method for powder, comprising causing a carrier gas and the powder material to form a revolving flow with an axis thereof directed axially of the high-frequency coil, within the powder supply nozzle arranged substantially radially centrally of the high-frequency coil, and then discharging the revolving flow from an outlet at an end of the nozzle to diffuse the powder material radially of the high-frequency coil to bring the same into contact with a plasma high-temperature region.

According to the invention, an increase in processing efficiency of powder can be achieved while suppressing generation of coarse powder since a powder material is diffused to a high-temperature region of plasma from a low-temperature region. Accordingly, the invention is very effective in manufacture of a base powder for that hot isostatic pressing, of which an increase in packing density is demanded, since a rapid increase in productivity of spheroidization of metallic powder can be achieved.

The invention will be described below in detail.

The apparatus according to the invention can attain the object without the necessity of supplying of a third gas, by virtue of adopting an interior design of a nozzle, concretely, a revolving flow forming device inside a powder supply nozzle, as means for diffusing a powder, being introduced into plasma flame, from a low-temperature region to a high-temperature region.

First, a plasma processing apparatus for powder, according to the invention, comprises, as a fundamental constitution, a powder supply nozzle to supply a powder material into plasma flame generated inside a high frequency coil.

This prescription elucidates a field involving an objective that the temperature distribution of high frequency induction plasma generated by a high frequency coil should be made effective use of to achieve an increase in processing efficiency of powder.

The invention comprises a powder supply nozzle arranged substantially radially centrally of a high frequency coil. Thereby, the powder supply nozzle is kept away from exposure to a high-temperature region of plasma flame. Also, by arranging the nozzle substantially radially centrally of the coil, the powder supplied to plasma flame can be diffused to a high-temperature region of plasma from a low-temperature region, so that it is possible to suppress generation of coarse particles, which are problematic in case of supplying the powder directly to the high-temperature region.

An important feature of the invention resides in an internal structure of a powder supply nozzle. The powder supply nozzle according to the invention comprises a revolving flow forming device to cause a carrier gas and a powder material to form a revolving flow therein with an axis thereof directed axially of the high-frequency coil. Thereby, the revolving flow is discharged from an outlet at the end of the nozzle.

More specifically, the powder is not simply discharged but the revolving flow is discharged, so that the powder material is diffused to the high-temperature region of plasma disposed radially of the high-frequency coil from the nozzle outlet under the influences of centrifugal forces of the revolving flow and the powder can be processed efficiently.

The powder supply nozzle thus arranged is exposed to the order of 3000 to 5000° C. nevertheless in the low-temperature region of plasma. Accordingly, powder supply nozzles are generally double-structured and subjected to forced cooling by a high-pressure cooling water so as to protect powder supply nozzles from plasma heating. It is difficult to increase mechanical accessories except a nozzle in such severe environment, and so it is effective in terms of durability of the apparatus to enable diffusing a powder material to the high-temperature region with the internal structure of the nozzle.

DETAILED DESCRIPTION OF THE INVENTION

Figure 1:
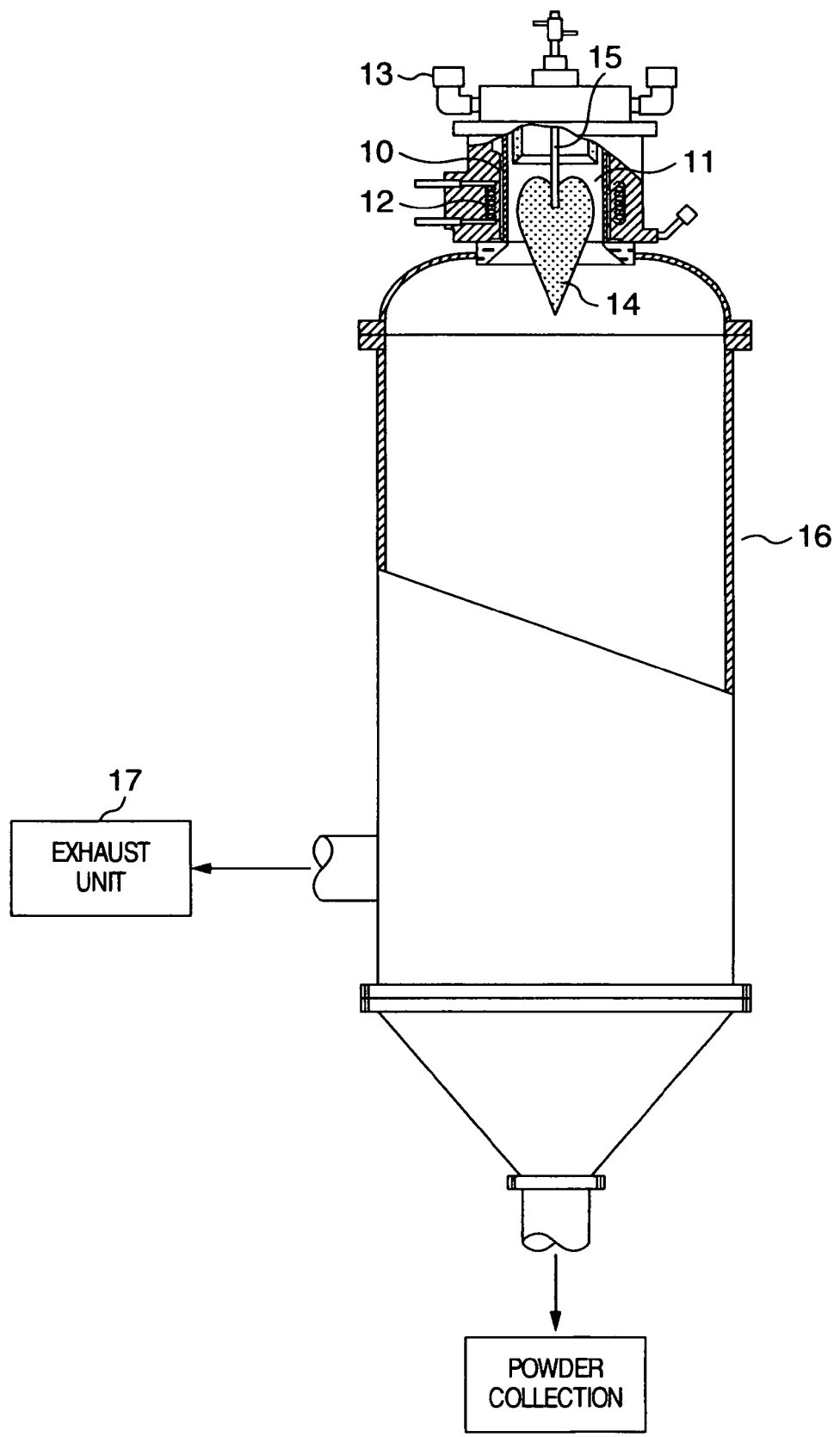
FIG. 1 is a view showing an embodiment of an apparatus according to the invention.
Figure 2:
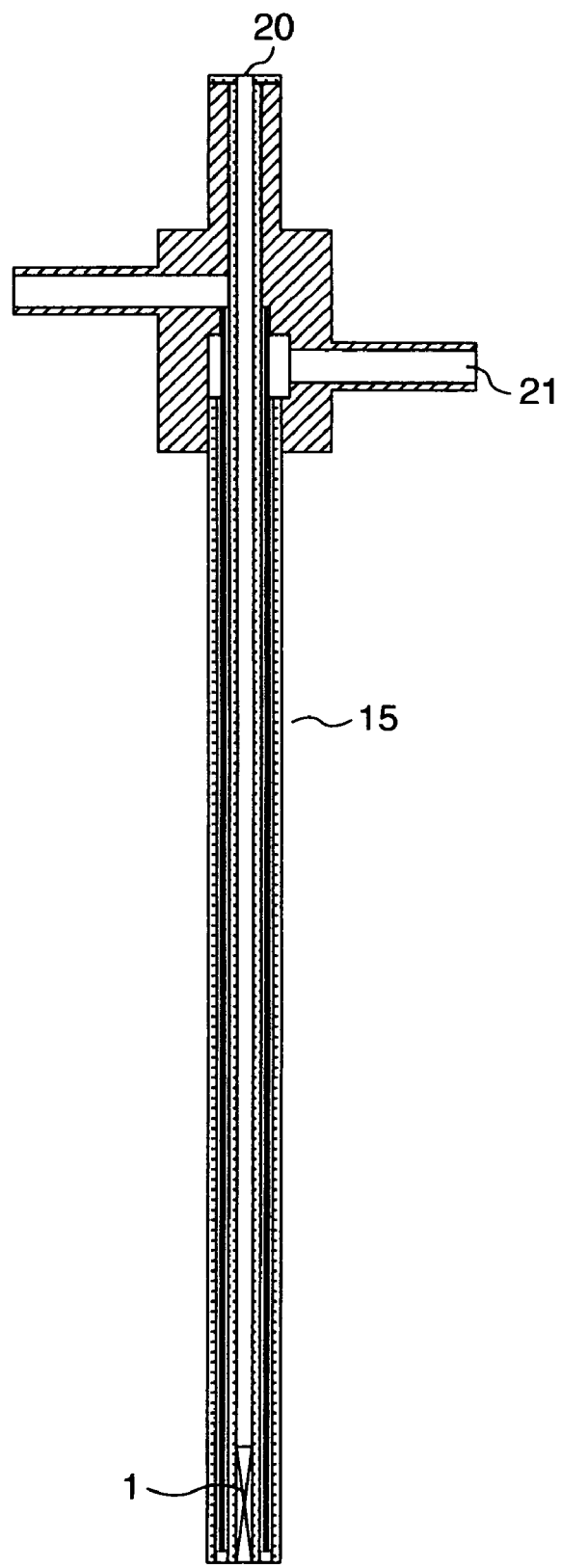
FIG. 2 is a view exemplarily showing a powder supply nozzle applied to the apparatus according to the invention.
Figure 3:
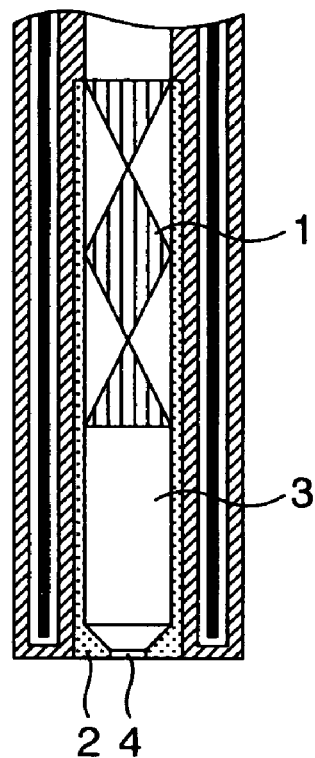
FIG. 3 is a view exemplarily showing a tip end of the powder supply nozzle applied to the apparatus according to the invention.
Figure 4:
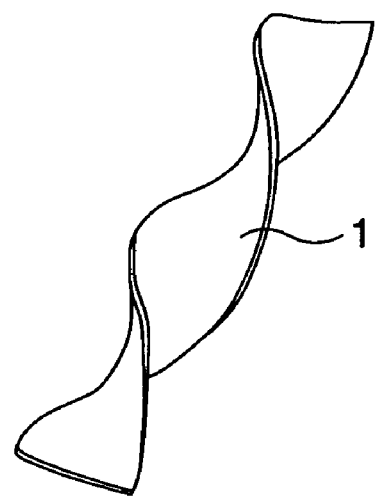
FIG. 4 is a perspective view exemplarily showing a spiral-shaped plate serving as a revolving flow forming device according to the invention.

An explanation will be given below with reference to the drawings. FIG. 1 is a view showing an embodiment of a whole plasma processing apparatus according to the invention, FIG. 2 is a view exemplarily showing a powder supply nozzle of the plasma processing apparatus for powder, according to the invention, FIG. 3 is a view exemplarily showing a tip end of the powder supply nozzle of the plasma processing apparatus for powder, according to the invention, and FIG. 4 is a perspective view exemplarily showing a spiral-shaped plate applied to the invention. A plasma processing apparatus for powder, shown in FIG. 1, comprises a high-frequency coil 12 provided outside a plasma generating space 11 partitioned by a cooling wall 10, a gas providing unit 13 to supply a plasma gas from one axial end of the high-frequency coil 12, a powder supply nozzle 15 to supply a powder material and a carrier gas into plasma flame 14 generated inside the high-frequency coil, a chamber 16 provided downstream of the plasma flame, and an exhaust unit 17 for exhaustion from the chamber.

As shown in FIG. 2, the powder supply nozzle 15 arranged substantially radially centrally of the high-frequency coil 12 comprises a material supply flow passage 20 extending vertically through the powder supply nozzle to permit the carrier gas and the powder material to pass therethrough, and a cooling-water flow passage 21 to cool the powder supply nozzle 15, and a spiral-shaped plate 1, shown in FIG. 4, formed by twisting a flat plate and a tip member 2 are combined as a revolving flow forming device, which forms a revolving flow with an axis thereof directed axially of the high-frequency coil, to be inserted into a tip end of the powder supply nozzle and arranged in a position, in which an axis of the spiral-shaped plate 1 corresponds to a longitudinal direction of the flow passage as shown in FIG. 3. Further, a transition space 3 is provided between the spiral-shaped plate and a powder supply nozzle outlet 4, and the powder supply nozzle outlet 4 is smaller in inside diameter than an area, in which the spiral-shaped plate 1 is arranged.

According to the invention, while a construction, in which powder fed under gas pressure in a tangential direction is charged into a flow passage, and a construction, in which a continuous or discontinuous fin is arranged spirally on an outer periphery of a flow passage, or the like is conceivable as a revolving flow forming device inside the powder supply nozzle, arranging a spiral to form a spiral flow passage is advantageous in forming a revolving flow surely. In particular, application of the spiral-shaped plate 1 shown in FIG. 4 is preferable because there is a less barrier in a direction along a flow passage and pressure loss is decreased.

As shown in FIG. 3, the powder supply nozzle outlet is smaller in inside diameter than an area, in which the revolving flow forming device is arranged, that is, a tip end of the powder supply nozzle outlet is reduced in inside diameter, whereby pressure difference between an interior of the nozzle and the plasma generating space can be increased, so that powder gushing out from the nozzle outlet can be diffused toward the high-temperature region on the outer peripheral portion of plasma flame.

Also, as shown in FIG. 1, owing to the provision of the transition space 3, the revolving flow formed by the powder and a carrier gas can gush out more evenly while having a flare vector.

EXAMPLE 1

Using a thermal plasma apparatus shown in FIG. 1, the spiral-shaped plate 1 shown in FIG. 4 was mounted and an outlet of the tip member 2 was modified in shape, influences of which on powder processing were examined.

Figure 5A:
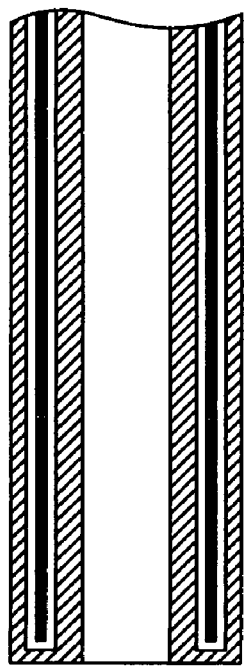
FIGS. 5A to 5D are views showing tip ends of powder supply nozzles evaluated in relation to the embodiment of the invention.

FIGS. 5A to 5D show shapes of nozzle tip ends. First, FIG. 5A shows a normal straight nozzle having an inside diameter of 4.5 mm and provided with no revolving flow forming device.

Figure 5B:
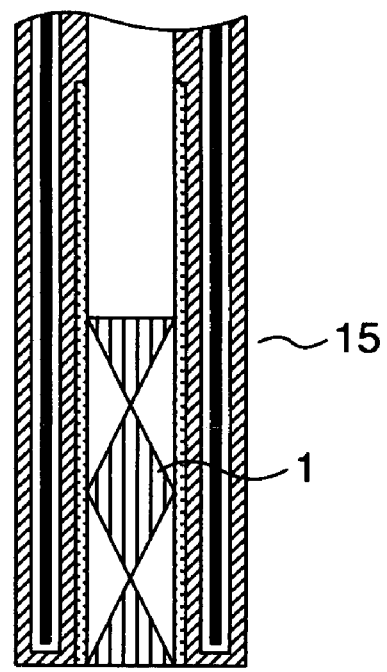

FIG. 5B shows a nozzle provided at a tip end thereof with a spiral-shaped plate 1. As the spiral-shaped plate, one formed by twisting a flat sheet of JIS SUS304 having a thickness of 0.3 mm was used.

Figure 5C:
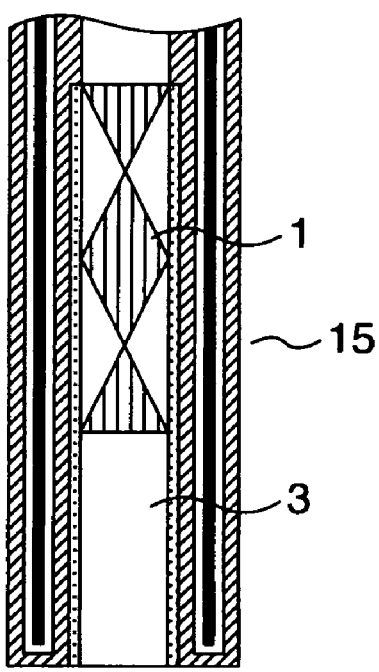
Figure 5D:
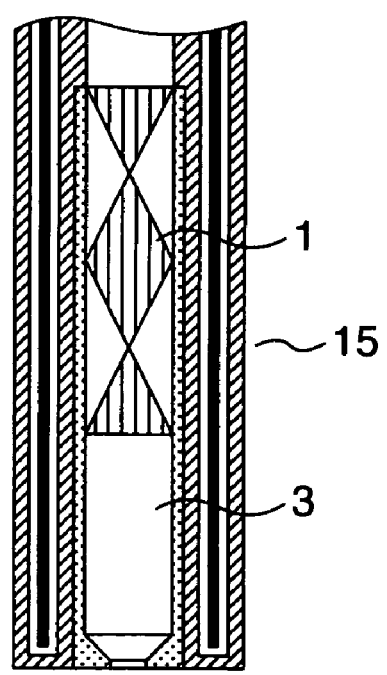

FIG. 5C shows a nozzle, in which a transition space 3 is defined 15 mm distant from a tip end thereof and a spiral-shaped plate 1 is mounted in a position distant from the tip end. FIG. 5D shows a nozzle, which is of the same construction as that of the nozzle shown in FIG. 3, and in which a transition space 3 is defined 15 mm distant from a tip end thereof, the tip end having an inside diameter as small as 3 mm.

The inventors of the present application have tried spheroidization of powder by using the respective nozzles shown in FIGS. 5A to 5D, varying the feed rate of powder, and charging the powder into plasma.

As the processed powder being evaluated, a commercially available Mo powder having an average particle size of 15 $\mu$m and a purity of 99.95% was used. While the powder had an average particle size of 15 $\mu$m, it assumed that form, in which primary particles having a particle size of several $\mu$m coagulated to make particles.

The plasma processing apparatus as used was one having a plasma generating space of $\phi$100 mm, and it was set such that the plasma operating conditions at the time of processing included an output of 200 kW and pressure of 70 kPa, Ar gases having a flow rate of 250 L/min (normal condition) and $H_2$ gases having a flow rate of 30 L/min (normal condition) were used as plasma gases, and Ar gases having a flow rate of 10 L/min (normal condition) were used as carrier gases.

A nozzle outlet of the powder supply nozzle 15 was set to be positioned radially centrally of the high-frequency coil and longitudinally centrally of the high-frequency coil.

Figure 6:
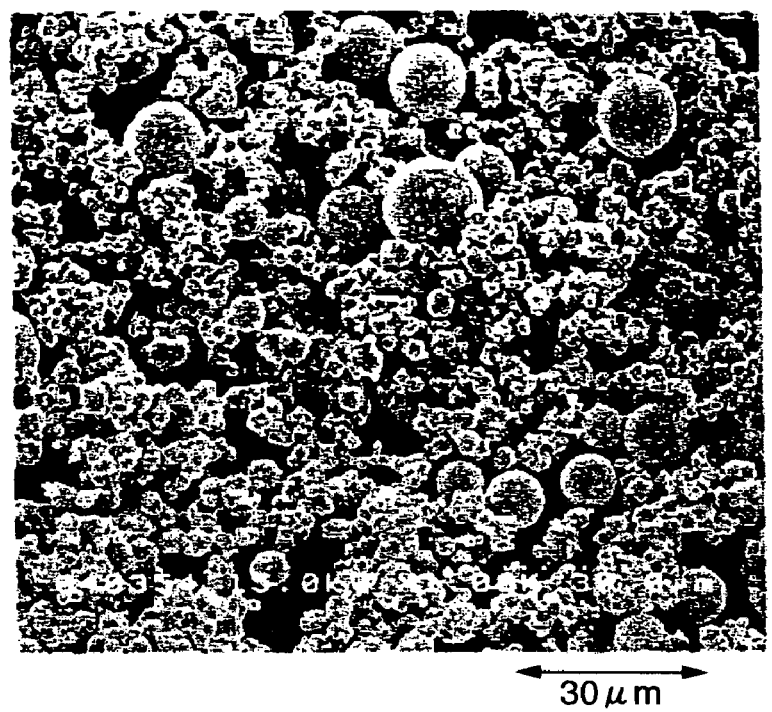
FIG. 6 is a photograph indicating the particle structure of powder obtained in application of a powder supply nozzle according to a comparative example.
Figure 7:
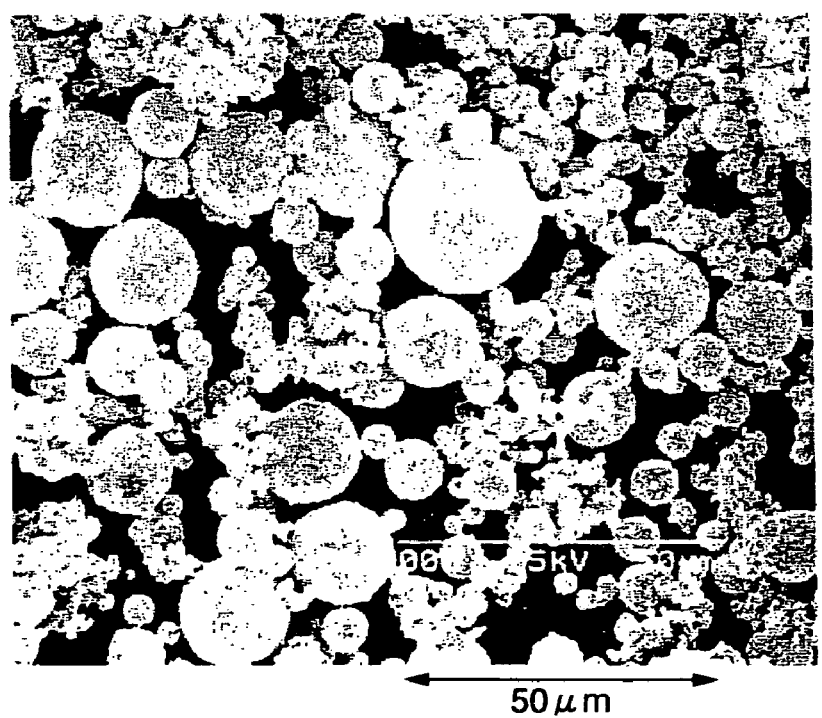
FIG. 7 is a photograph indicating the particle structure of powder obtained in application of a powder supply nozzle according to an embodiment of the invention.

FIG. 6 shows a photograph indicating the particle structure of powder obtained in the processing of 8 kg/h with the use of the conventional straight nozzle shown in FIG. 5A. FIG. 7 shows a photograph indicating the particle structure of powder obtained in the processing of 20 kg/h with the use of the nozzle, according to the invention, shown in FIG. 5D.

As apparent from a comparison of FIG. 6 with FIG. 7, it is found that in spite of more throughput, spheroidization advances in the powder shown in FIG. 7 and obtained by the apparatus of the invention with the use of the nozzle shown in FIG. 5D.

Figure 8:
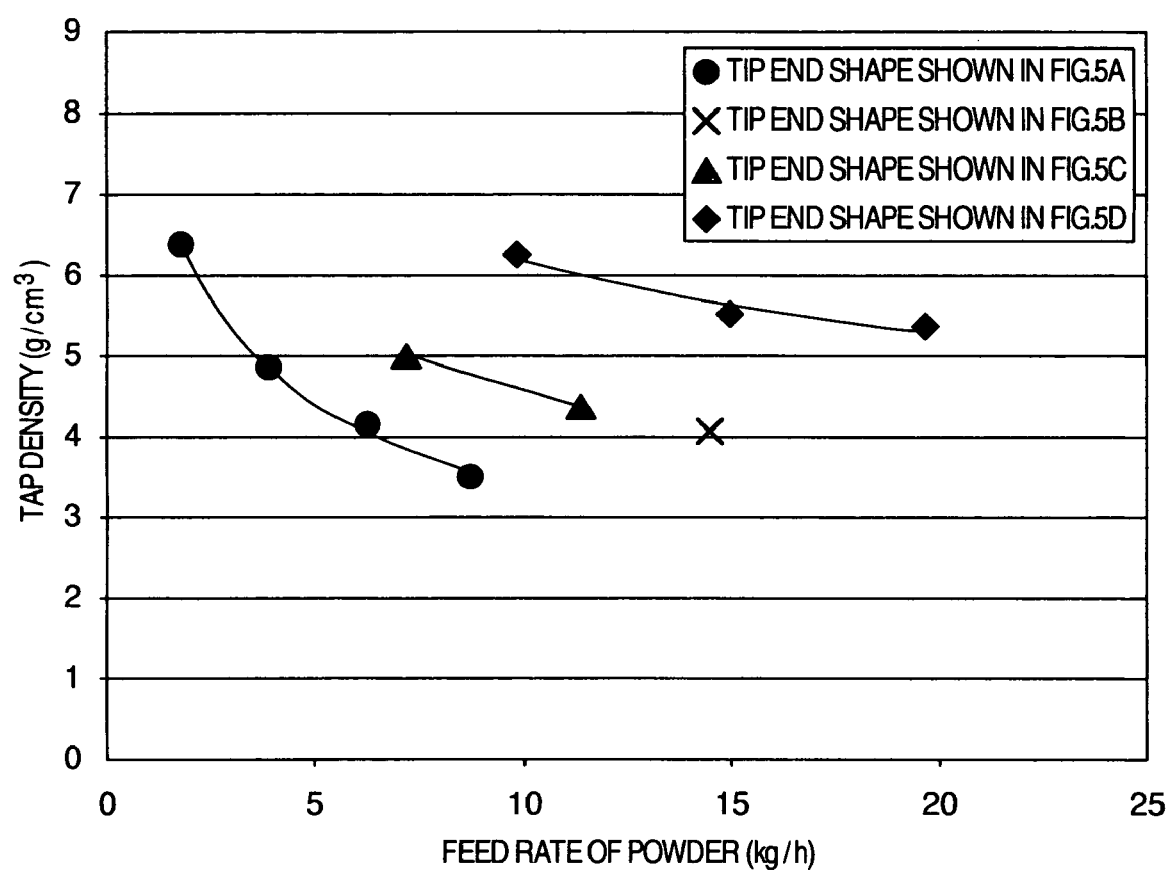
FIG. 8 is a graph indicating the relationship between powder throughput and tap density for the embodiments of the invention and the comparative example.

Since the powder material assumed the coagulated form and so the degree of spheroidization was hard to quantitate, the inventors of the present application have measured a tap density on the basis of JIS K5101 to evaluate the effect of plasma processing. FIG. 8 indicates the results. The evaluation is based on the knowledge that there is a correlation between advancement in spheroidization of powder and an increase in tap density.

As shown in FIG. 8, the embodiment of the invention with the spiral-shaped plate mounted makes it possible to maintain a high level in tap density even with an increase in throughput, as compared with the straight nozzle, and so it is found that the processing of powder has advanced. In particular, it is found that the embodiment of the invention, shown in FIG. 5D, in which the transition space and small sizing of the tip end are used in combination, gives a high tap density up to the throughput of 20 kg/h and so is very effective.

The invention claimed is:

1. A plasma processing appararatus for powder, comprising a powder supply nozzle to supply a powder material into plasma flame generated inside a high-frequency coil, wherein the powder supply nozzle is arranged substantially radially centrally of the high-frequency coil so as to be inserted in the plasma flame, and comprises a revolving flow forming device to cause a carrier gas and the powder material to form therein a revolving flow with an axis thereof directed axially of the high-frequency coil, and the revolving flow is discharged from an outlet at an end of the nozzle,
wherein the powder supply nozzle is cylindrical-shaped and has a longitudinal axis, and wherein the revolving flow forming device comprises a longitudinally extending spiral-shaped flow passage which is arranged in the powder supply nozzle, and which has a longitudinal axis corresponding to the longitudinal axis of the nozzle.

2. The plasma processing apparatus for powder, according to claim 1, wherein the outlet at the end of the powder supply nozzle has an inside diameter smaller than that of a portion, in which the revolving flow forming device is arranged.

3. The plasma processing apparatus for powder, according to claim 2, further comprising a transition space formed between the revolving flow forming device and the outlet at the end of the powder supply nozzle.

4. The plasma processing apparatus for powder, according to claim 1, further comprising a transition space formed between the revolving flow forming device and the outlet at the end of the powder supply nozzle.

5. The plasma processing apparatus according to claim 1, wherein the revolving flow forming device comprises a spiral-shaped plate containing said spiral-shaped flow passage.

6. A plasma processing apparatus for powder, comprising a high-frequency coil provided outside a plasma generating space partitioned by a cooling wall, a gas providing unit to supply a plasma gas from one axial end of the high-frequency coil, a powder supply nozzle to supply a powder material and a carrier gas into plasma flame generated inside the high-frequency coil, a chamber provided downstream of the plasma flame, and an exhaust unit for exhaustion from the chamber, and wherein the powder supply nozzle is arranged substantially radially centrally of the high-frequency coil and comprises a revolving flow forming device to cause a carrier gas and the powder material to form therein a revolving flow with an axis thereof directed axially of the high-frequency coil, and the revolving flow forming device comprises a spiral-shaped plate formed by twisting a flat plate and arranged in a position, in which an axis of the spiral-shaped plate corresponds to a longitudinal direction of a flow passage.

7. The plasma processing apparatus for powder, according to claim 6, wherein an outlet at an end of the powder supply nozzle has an inside diameter smaller than that of a portion, in which the revolving flow forming device is arranged.

8. The plasma processing apparatus for powder, according to claim 7, further comprising a transition space formed between the revolving flow forming device and the outlet at the end of the powder supply nozzle.

9. The plasma processing apparatus for powder, according to claim 6, further comprising a transition space formed between the revolving flow forming device and an outlet at an end of the powder supply nozzle.

* * * * *